United States Patent [19]
Shimizu

[11] 3,721,858
[45] March 20, 1973

[54] SIZE AND HIGH VOLTAGE STABILIZING CIRCUIT

[75] Inventor: Kunio Shimizu, Osaka, Japan

[73] Assignee: Sanyo Electric Co., Ltd., Tokyo, Japan

[22] Filed: Aug. 19, 1970

[21] Appl. No.: 64,987

[30] Foreign Application Priority Data

| | | |
|---|---|---|
| Aug. 19, 1969 | Japan | 44/65519 |
| April 20, 1970 | Japan | 45/34003 |
| April 20, 1970 | Japan | 45/34004 |
| April 20, 1970 | Japan | 45/34005 |
| April 20, 1970 | Japan | 45/34006 |

[52] U.S. Cl. .......... 315/29, 315/28
[51] Int. Cl. .......... H01j 29/70
[58] Field of Search .......... 315/27–29, 27 TD, 315/22, 18, 19

[56] References Cited

UNITED STATES PATENTS

| | | | |
|---|---|---|---|
| 2,997,622 | 8/1961 | Claypool | 315/29 |
| 2,697,798 | 12/1954 | Schlesinger | 315/28 |
| 2,882,337 | 4/1959 | Squires | 315/28 |

*Primary Examiner*—Carl D. Quarforth
*Assistant Examiner*—J. M. Potenza
*Attorney*—Brufsky, Staas, Breiner and Halsey

[57] ABSTRACT

A circuit for use in a color television receiver compensates for variations in the raster width resulting from the adjustment of the "Brightness" control and stabilizes the high voltage supply to reduce voltage variations. To this end, there is provided a control circuit for controlling the voltage to be applied to a horizontal output transistor and a detector means for detecting beam current. In alternative embodiments, there is also provided a shunt means for shunting a portion of the beam current.

22 Claims, 6 Drawing Figures

INVENTOR
KUNIO SHIMIZU

BY
Brufsky, Staas, Breiner & Halsey
ATTORNEYS

SIZE AND HIGH VOLTAGE STABILIZING CIRCUIT

BACKGROUND OF THE INVENTION

1. Field of the Invention

The present invention relates to a size stabilizing circuit for use in a color television receiver and, more particularly, to a circuit for compensating for variations in the raster width resulting from the adjustment of the "-Brightness" control and for stabilizing the high voltage supply to reduce variations in the high voltage potential.

2. State of the Prior Art

It is well known that in color television receivers as generally available heretofore, the raster width and height typically are determined by the value of the current, or output voltage, supplied by the horizontal deflection circuit and the vertical deflection circuit, respectively, to the deflection coil associated with the cathode ray tube.

It is also known that when the "Brightness" level is increased, such as by turning up the control knob, the current level of the scanning beam of the cathode ray tube is increased as a result of the increase in the value of the high voltage supplied to the cathode ray tube, or when the value of the output voltage from either of said deflection circuits varies, the raster width and/or height is disturbed.

Various attempts have been made heretofore to eliminate the above-mentioned defect heretofore inherent in conventional television receivers. One attempt to compensate for the annoying raster width variations resulting from the adjustment of the "-Brightness" control knob, as provided in transistorized television receivers and especially in transistorized color television receivers, is that of stabilizing the high voltage supply to the cathode ray tube. In one such prior art system, the high voltage generating circuit is connected with a shunt regulator circuit in such a manner that the sum of the current flowing through the high voltage load circuit of the cathode ray tube and the current flowing through the shunt regulator circuit is maintained at a constant value. As a result, however, the horizontal output stage is operated continuously under the maximum load condition and, therefore, the reliability of the output transistor is lowered.

SUMMARY OF THE INVENTION

The present invention is directed to eliminating the above-described defects inherent in conventional transistorized color television receivers.

In accordance with the invention there is provided a picture size stabilizing circuit comprising a detector means for detecting a beam current supplied from a power source connected with one end of said detector means, other end of said detector means being connected with a cold terminal of the secondary winding of a flyback transformer of which the other hot terminal being connected with a cathode ray tube anode of the television receiver, and a control circuit for controlling voltage to be applied to an output transistor, said control circuit being controlled by the output of said detector means.

Beam current detector systems including a detector connected to the cathode of the cathode ray tube are known. However, if such system is employed in connection with a cathode ray tube of three electron gun type for use in a color television receiver, additional detectors for detecting each beam current are required, resulting in a substantial increase in the complexity of the circuitry of the color television receiver.

According to the present invention, such additional detectors as required by prior art systems and which result in the complicated circuitry are advantageously eliminated by the provision of connecting the beam current detector means to a cold terminal of the secondary winding of a flyback transformer. Moreover, the cold terminal of the secondary winding of the flyback transformer can be advantageously connected to any power source, resulting in reducing the cost and time necessary to construct the color television receiver circuitry.

In the case where the present invention is applied for the purpose of preventing the annoying raster width variations resulting from the adjustment of the "-Brightness" control knob, the variations are corrected by controlling the value of DC voltage supplied to the deflection circuit, thereby to adjust the level of deflection currents supplied from the horizontal and vertical deflection circuits while the variation in the value of the high voltage resulting from the adjustment of the "-Brightness" control knob is passed over untreated. Therefore, it is apparent that the increase in the load resulting from the correction of the raster width variations can be shared by the control circuit of the invention.

On the other hand, in the case where the present invention is applied for the purpose of stabilizing the high voltage potential, variations in the value of the high voltage potential are prevented by means of the control circuit of the invention by controlling the value of the DC voltage supplied to the horizontal deflection output transistor. Therefore, the increase in the load resulting from controlling the high voltage can be advantageously shared by the control circuit.

In either case, the reliability of the horizontal deflection output transistor is improved as compared with conventional systems wherein the high voltage is stabilized by means of a shunt regulator circuit.

It is noted that the term "beam current" is used hereinbefore and hereinafter to designate the current to be supplied to the anode of the cathode ray tube.

The present invention will be hereinafter fully described by way of example in connection with preferred embodiments thereof shown in the attached drawings.

DETAILED DESCRIPTION OF THE INVENTION

Figure 1:
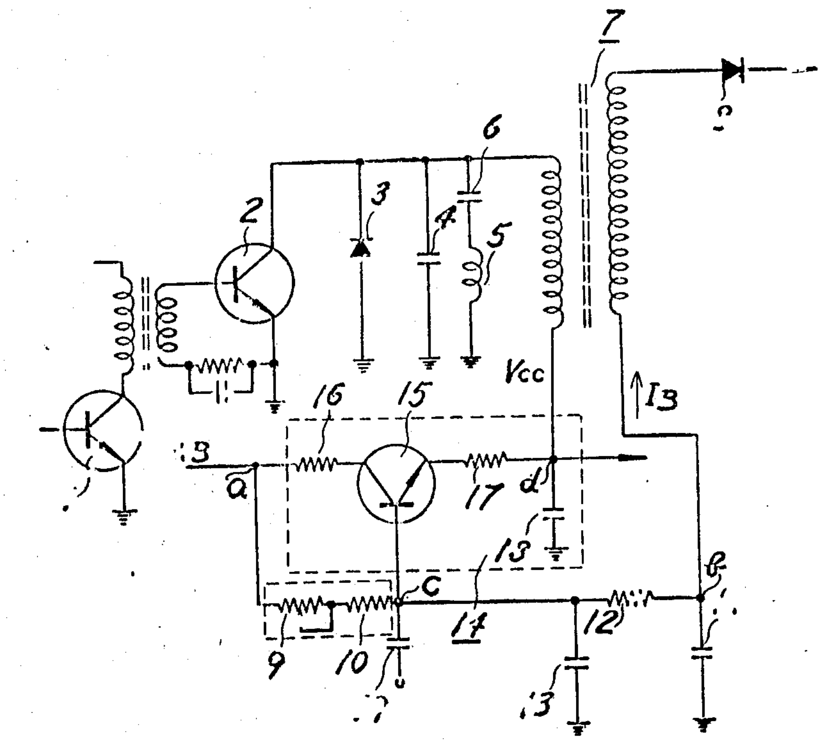
FIG. 1 is a schematic of a picture size stabilizing circuit for use in a color television receiver in accordance with the present invention.

It is noted that like parts are designated by like reference numerals throughout the drawings and the following discussion thereof.

In FIG. 1 is shown a picture size stabilizing circuit in accordance with a first embodiment of the present invention. A horizontal drive transistor 1 is coupled at its output to the input of a horizontal deflection output transistor 2. A damper diode 3 is connected between the collector of the transistor 2 and ground. A resonance capacitor 4 interposed between the collector and said transistor 2 and ground is selected to determine a desired value of the retrace time in resonant circuit relationship with a horizontal deflection coil 5, one end of the coil 5 being connected to ground and the other end being connected through a coupling capacitor 6 to the common junction of capacitor 4 and the collector of transistor 2. The coupling capacitor 6 is provided to restrict the flow of DC current and to effect an S-shape compensation.

A flyback transformer 7 includes a primary winding connected at one end to the collector of the transistor 2 and at the other end to ground through a bypass capacitor 18. A high voltage rectifying diode 8 is connected at its anode to the hot or high voltage terminal of the secondary winding of said flyback transformer 7 and at its cathode to the anode terminal of a cathode ray tube (not shown).

A detector means comprises a variable resistor 9 and a resistor 10 connected in series with said variable resistor 9, the variable resistor 9 concurrently constituting a horizontal deflection adjustment. Capacitor 13 is connected at one terminal to ground and at its other terminal to the base of a transistor 15 and is adapted to permit the AC power to flow to ground.

There is further provided a filter comprising a resistor 12 and a capacitor 11. The resistor 12 is connected at one end to the detector means and at its other end to the cold or low voltage terminal of the secondary winding of the flyback transformer 7. The capacitor 11 is connected at its one end to ground and at its other end to the cold, or low voltage terminal of the secondary winding of the flyback transformer. The filter serves to smooth the horizontal signal component. A control circuit 14 provided in accordance with the invention includes the transistor 15, current limiters 16 and 17 and a bypass capacitor 18. The current limiters comprise a first resistor 16 connected between the collector of the transistor 15 and a +B power source and a second resistor 17 connected between the emitter of the transistor 15 and a junction d which is in turn connected with the other end of the primary winding of the flyback transformer 7. Finally, a capacitor 19 is connected between the base of the transistor 15 and the vertical deflection circuit (not shown).

The operation of the picture size stabilizing invention is as follows. Assuming that the "Brightness" control knob is, for example, turned up to brighten up the overall lighting of the scene on the cathode ray tube, the level of the beam current in the cathode ray tube is increased and as a result thereof the level of the high voltage applied to said cathode ray tube decreases. In prior art circuits, this typically results in the raster width on the screen of the cathode ray tube being considerably disturbed. More specifically, due to increase in the brightness and the corresponding increase in the level of the beam current, the resulting reduction in the anode voltage increases the sensitivity of the beam to the deflection field with the result that the width of the raster scan increases. Correspondingly, a decrease in beam current which results in an increase in anode voltage may reduce the effect of the deflection field on the beam and cause the raster width to decrease. However, in the circuit of the invention, the current at the anode of the cathode ray tube is supplied from the +B power source through the detector means composed of the variable resistor 9 and the resistor 10, and through the filter composed of the resistor 12 and capacitor 11. As a result, the value of the potential at the junction C, and thus at the base terminal of the transistor 15, drops at this time, lowering the level of conduction of the transistor 15 and correspondingly increasing its inner impedance with the result of reducing the voltage level at a junction (d), and thus reducing the level of DC power voltage (Vcc) supplied to the horizontal deflection output transistor 2.

As the value of DC power voltage (Vcc) is reduced, the deflection current supplied from the horizontal deflection output transistor 2 is also reduced whereby the raster width variation on the screen of the cathode ray tube which would otherwise occur is reduced.

Thus, it will be understood that the raster width variation attendant the decrease of the value of high voltage at the anode of the cathode ray tube can be well compensated by the reduction of the value of the deflection current and the corresponding reduction of every line width.

In the case where the "Brightness" control knob is turned down to dull the overall lighting of the scene on the screen of the cathode ray tube, the converse of the above-described operation will take place, giving the same result of compensating for the raster width variation as in the case where the "Brightness" control knob is turned up.

In this circuit thus constructed according to the present invention, if parabolic waves are applied to the base of the transistor 15 from a vertical oscillation circuit (not shown) through the capacitor 19, a pincushion distortion appearing on the screen can be corrected.

It is noted that the stabilizing circuit according to the present invention is not limited to the compensation of the annoying raster width. Rather, in accordance with a further feature thereof, if the design is made such that DC power is supplied to a vertical deflection transistor (not shown) through the control circuit 14, raster height variations attributable to variation in the vertical deflection circuit can similarly be compensated. Especially, where the oscillator employed in the vertical deflection circuit comprises a multivibrator, the electric power for compensating for the raster height variations may be applied either to the front stage or the rear stage of the multivibrator circuit.

Figure 2:
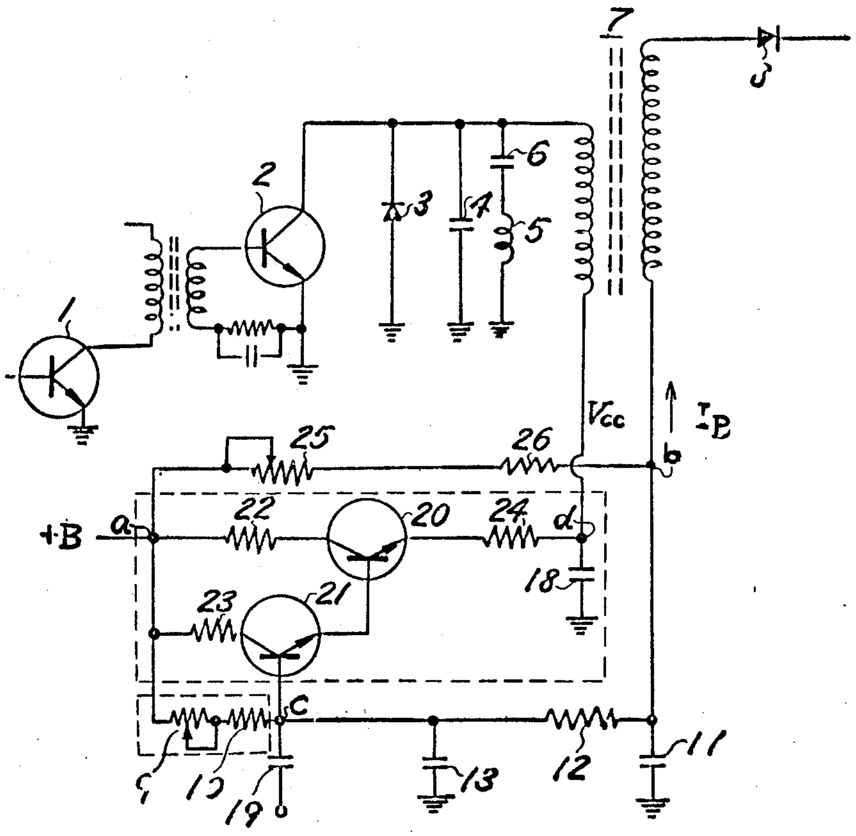
FIG. 2 is a schematic similar to that of FIG. 1, but wherein the portion of the picture size stabilizing circuit constituting the control circuit is modified.

In FIG. 2 there is shown another preferred embodiment of the present invention wherein like parts are designated by like numerals as shown in FIG. 1.

In the embodiment of the present invention shown in FIG. 2, the control circuit generally indicated by 14 in FIG. 1 and comprising the transistor 15, current limiters 16 and 17, and bypass capacitor 18, is modified. The control circuit of FIG. 2 comprises a first transistor 20, a second transistor 21, current limiters 22, 23, and 24 and bypass capacitor 18. In addition, for a reason as will be mentioned later, a variable resistor 25 and a resistor 26 connected in series therewith are disposed between a junction (a) and one terminal of the secondary winding of the flyback transformer 7. The variable resistor 25 and resistor 26 constitute a shunt means in parallel with the detector means comprising resistors 9 and 10, and therefore, the beam current supplied from the +B power source is caused to flow in part through said detect means and in part through said shunt means. By the provision of the first and second transistors 20 and 21 instead of the single transistor 15 shown in FIG. 1, the control sensitivity of the control circuit in this second embodiment of the present invention as shown in FIG. 2 is improved over that of FIG. 1.

However, in the case where the provision of the shunt means is not made, the beam current is supplied from the power source +B to the anode of the cathode ray tube (not shown) only through the detector means and the resistor connected in series with said detector means in the same manner as in the circuit shown in FIG. 1.

While in this condition, as the "Brightness" control knob is turned up, the same results will occur as hereinbefore described in connection with the first preferred embodiment with reference to FIG. 1.

If the control circuit is merely provided with the two transistors 20 and 21, thereby to increase a composite amplification factor thereof so that the control sensitivity may be improved, without the provision of the shunt means, over-compensation will take place in general. The reason therefor will be hereinafter described.

With regard to the transistors 20 and 21, the emitter of transistor 21 is connected to the base of the transistor 20, whereby the composite amplification factor is improved. When a current of predetermined value is supplied to the base of the transistor 21, the base current of the transistor 21 will be, for example, a fraction in the range of $1/10^4$ of the value of the emitter current of the transistor 20 in the common emitter amplification factor of the transistors 20 and 21 is assumed to be 100. In order to result in a voltage drop of predetermined value by the application of a base current to the transistor 21 of such value, a composite resistance of the detector means, i.e., the sum of the individual resistances of the variable resistor 9 and the resistor 10, should be of a substantial value, for example, some hundred thousand ohms. On the other hand, since a value of the beam current ($I_B$) will, in its extreme case, become 1 mA or so, the control voltage which appears on the detector means will be some hundred volts, resulting in that the raster width variations may be overcompensated.

Thus, because the transistors 20 and 21 are coupled with each other to achieve the result of increasing the effective amplification factor, the composite resistance of the detector means must necessarily be increased up to some hundred thousand ohms. Increase of said composite resistance of the detector means, however, results in a voltage drop of approximately some hundred volts, and, therefore, the voltage (Vcc) supplied to the horizontal deflection output transistor 2 is substantially lowered. As a result thereof, the deflection current is considerably reduced and the raster width variations may be overcompensated as hereinbefore described.

However, such defects can be advantageously eliminated by the provision of the variable resistor 25 and the resistor 26, together constituting the shunt means. It will be understood that by shunting the high voltage power across the shunt means, the voltage drop across the detector means of some hundred volts can be reduced whereby the possible overcompensation can be advantageously prevented.

Accordingly, the picture size stabilizing circuit in this second embodiment of the present invention permits the utilization of any transistor having a large amplification factor for improving the control sensitivity.

Figure 3:
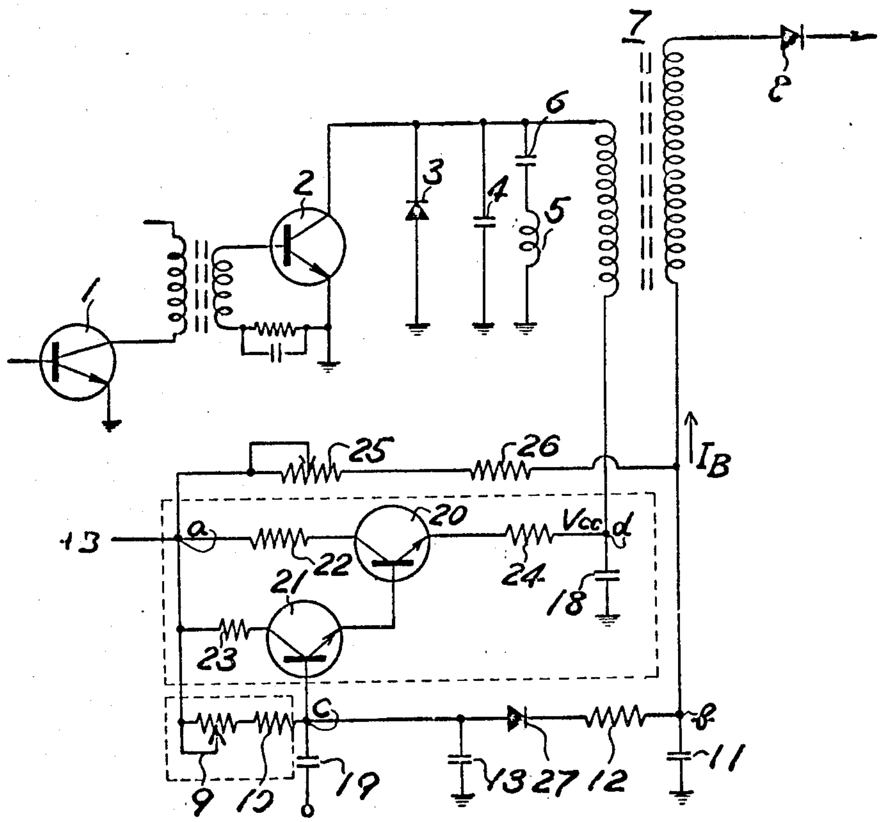
FIG. 3 is a schematic similar to that of FIG. 2, but including a further modification of the control circuit.

In FIG. 3 is shown a modification of the second embodiment shown in FIG. 2. In the circuit shown in FIG. 3, an additional undirectional conductive element 27 is interposed between the detector means and the resistor 12. This unidirectional conductive element is, for example, a diode which is rendered conductive as the value of the potential at the junction (c) becomes larger than that at the junction (b). When the diode 27 is in the conductive condition, a portion of the beam current flowing to the detector means is permitted to flow therethrough to the cold or low potential terminal of the secondary winding of the flyback transformer 7.

The operation of the circuit shown in FIG. 3, without the provision of the shunt means composed of the variable resistor 25 and the resistor 26, and the diode 27 can be described in the same way as hereinbefore described in connection with the circuit shown in FIG. 1.

The structural difference between the circuits shown in FIG. 2 and FIG. 3 resides in the provision of the diode 27, as is apparent from the foregoing description. However, a feature of the provision of this diode 27 resides in the fact that, when the "Brightness" control knob is turned down, i.e., when a value of the beam current becomes relatively small and, as a result thereof, the diode 27 is brought into the non-conductive condition, the DC voltage supplied to the horizontal deflection output transistor 2 can be maintained at a constant value irrespective of the beam current.

More specifically, since the resistances 25 and 26 of properly predetermined values are series connected between the junction (a) and the junction (b), it is apparent that the potential at the junction (b) is larger than that at the junction (c) when the value of the beam current is zero or extremely small. Therefore, the diode 27 is brought into the non-conductive condition whereby the beam current flows only through the shunt means. As a result, the DC voltage (Vcc) supplied to the horizontal deflection output transistor 2 can be maintained at a constant value. So long as the DC voltage (Vcc) is maintained at the constant value as hereinbefore described, no compensation of the annoying raster width takes place. However, in considering the screen of the cathode ray tube, the overall lighting of the scene on the screen is at this time relatively reduce, or dulled, so that the relatively small value of the beam current presents no problems.

However, as the "Brightness" control knob is turned up, i.e., as the value of the beam current increases, and, as a result, the potential at the junction (b) becomes smaller than that at the junction (c) by an amount determined by the voltage drop across the shunt means composed of the variable resistor 25 and the resistor 26, the diode 27 is brought into the conductive condition. When the diode 27 is in the conductive condition, the beam current from the power source +B flows in part through the detector means and in part through the shunt means. As a portion of the beam current flows through the detector means, the value of the potential at the junction (b) is reduced, resulting in a reduction of the value of the DC voltage (Vcc) supplied to the horizontal deflection output transistor 2. Therefore, it will be understood that the raster width variation is well compensated as hereinbefore described.

Figure 4:
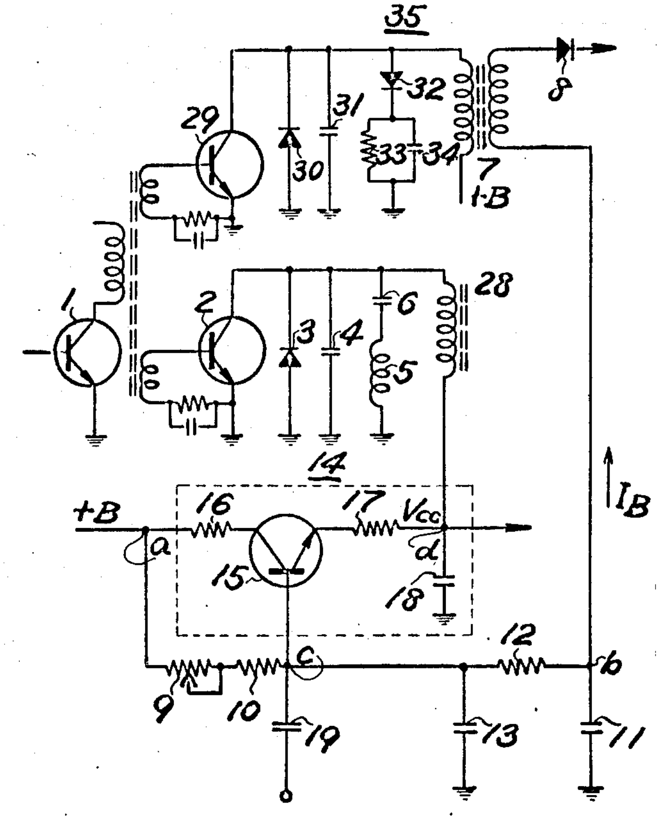
FIG. 4 is a schematic similar to that of FIG. 1, but wherein the upper portion of the circuit shown in FIG. 1 is modified to include both a horizontal deflection output circuit and a high voltage output circuit, while the lower portion thereof is preserved as shown in FIG. 1.

In FIG. 4 is shown a fourth embodiment of the picture size stabilizing circuitry of the present invention wherein the horizontal deflection output circuit shown in FIG. 1 is divided into two circuits, i.e., a horizontal deflection output circuit and a high voltage output circuit, while the control circuit is preserved as shown in FIG. 1. It is noted that the horizontal deflection output circuit shown in FIG. 1 has been described as constructed to perform a dual function and particularly a combination of a horizontal deflection output circuit and a high voltage output circuit. This picture size stabilizing circuitry is designed to stabilize the raster width by controlling the DC voltage to be supplied to the horizontal deflection output circuit.

Referring now to FIG. 4, reference numeral 28 identifies a choke coil, one end of which is connected to the junction (d) and the other end of which is connected with the collector of a horizontal deflection output transistor 2.

Reference numeral 29 identifies a high voltage output transistor, the collector of which is connected with one end of the primary winding of the flyback transformer 7, the other end of said primary winding being in turn connected with the power source (+B). A damper diode 30 has its cathode connected with a line connecting the collector of the transistor 29 and the end of the primary winding of the flyback transformer 7, while the anode of the damper diode is grounded.

Reference numeral 31 identifies a resonance capacitor connected at its one end with the above-described line connected to the primary winding of flyback transformer 7 and connected at its other end to ground for determining a value of the retrace time in resonance with the flyback transformer 7.

Reference numeral 35 identifies a clipper composed of a diode 32, a resistor 33, and a capacitor 34, all of these parts being connected in such a manner that the anode of said diode 32 is connected with the collector of the high voltage output transistor 29 to which one end of the primary winding of the flyback transformer 7 is also connected, while the cathode of said diode 32 is connected to one end of the parallel-connected network of the resistor 33 and the capacitor 34, he other end of the parallel network being connected to ground. The clipper thus composed acts in such a manner that, when the collector of the high voltage output transistor 29 is loaded with abnormal pulses, the diode 32 is brought into the conductive condition whereby the high voltage output transistor 29 can be prevented from being overloaded.

In this arrangement, according to the present invention, when the "Brightness" control knob is turned up and, as a result thereof, increase of the current at the anode of the cathode ray tube takes place, the high voltage of the cathode ray tube is reduced, tending to increase the raster width. However, since the anode current is supplied from the power source (+B) through the variable resistor 9 and resistor 10 which constitute the detector means, and the resistor 12 which, with capacitor 13 constitutes the filter, the value of the potential at the junction (c) and thus at the base of the transistor 15 within the control circuit 14 takes place, increasing the value of the inner impedance of the transistor 15.

As the value of the inner impedance of the transistor 15 increases, the value of the voltage Vcc at the junction d is reduced, i.e., the DC voltage to be supplied to the horizontal deflection output transistor 2 is reduced. As a result, the deflection current from the horizontal deflection output transistor 2 is reduced. Thus, it will be clearly understood that the raster width variation is well compensated by reducing the value of the deflection current and correspondingly reducing the resultant line width.

It is noted that the control circuit included in the picture size stabilizing circuitry of FIG. 4 may be substituted by that shown in FIG. 2 or FIG. 3, without any reduction of the resulting effect obtainable in accordance with the present invention.

Figure 5:
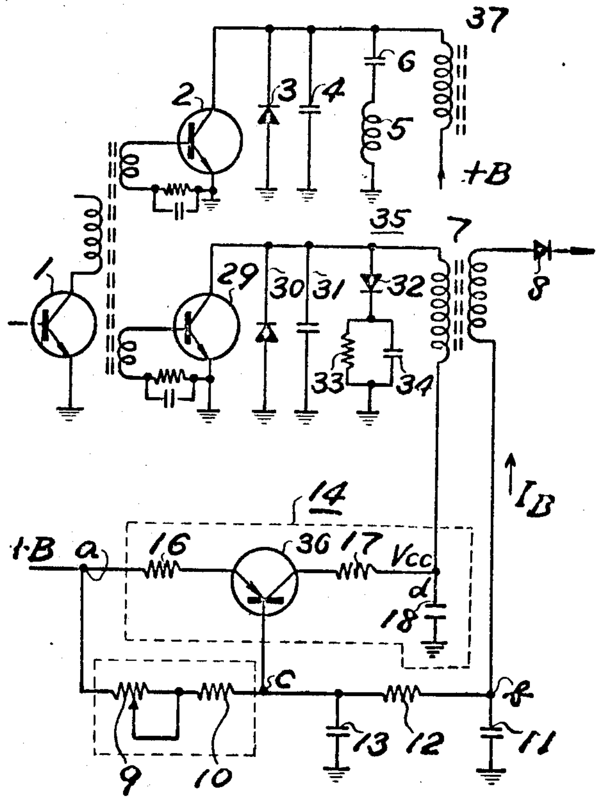
FIG. 5 is a schematic similar to that of FIG. 4, but wherein a portion of said high voltage output circuit is modified.

The picture size stabilizing circuitry shown in FIG. 4 can be modified as shown in FIG. 5 for providing stabilization of the electric power to be supplied to the cathode ray tube by means of the connection of the detector means and the control circuit to the high voltage output circuit instead of the horizontal deflection output circuit.

Referring now to FIG. 5, it is first noted that the construction of the control circuit shown in FIG. 5 is substantially similar to that shown in FIG. 1 except that a p-n-p type transistor 36 is substituted for the transistor 15 in FIG. 1. The collector of the p-n-p transistor 36 is connected to one end of the primary winding of the flyback transformer 7 through the resistor 17, the other end of the primary winding of the transformer 7 being connected to the collector of the transistor 29. As in FIG. 1, the detector means comprising resistors 9 and 10 is connected between a cold or low voltage terminal of the secondary winding of the flyback transformer 7 and the power source +B through the resistor 12 of the filter including resistor 12 and capacitor 11.

In the arrangement shown in FIG. 5, when the "-Brightness" control knob is, for example, turned up, the resultant increase in the value of the DC voltage Vcc supplied to the high voltage output transistor 29 occurs in the substantially same manner as hereinbefore fully described. However, in accordance with the design of the flyback transformer 7, the peak value of the pulse voltage supplied by the high voltage output transistor 29 through its collector at the time when the load current increases can be varied. Accordingly, if the flyback transformer is designed such that the value of the voltage to be supplied thereto increases in proportion to the increase of the value of the load current to be applied thereto, the high voltage generated in the secondary winding of the flyback transformer 7 can be increased when the value of the load current actually increases.

Thus, it will be clearly understood that the reduction of the high voltage can be well compensated by the increase of the load current to the transistor 29, and vice versa.

It is noted that the control circuit included in the high voltage stabilizing circuitry of FIG. 5 may be substituted by that shown in FIG. 2 or FIG. 3, without any reduction of the resulting effect obtainable in accordance with the present invention.

Figure 6:
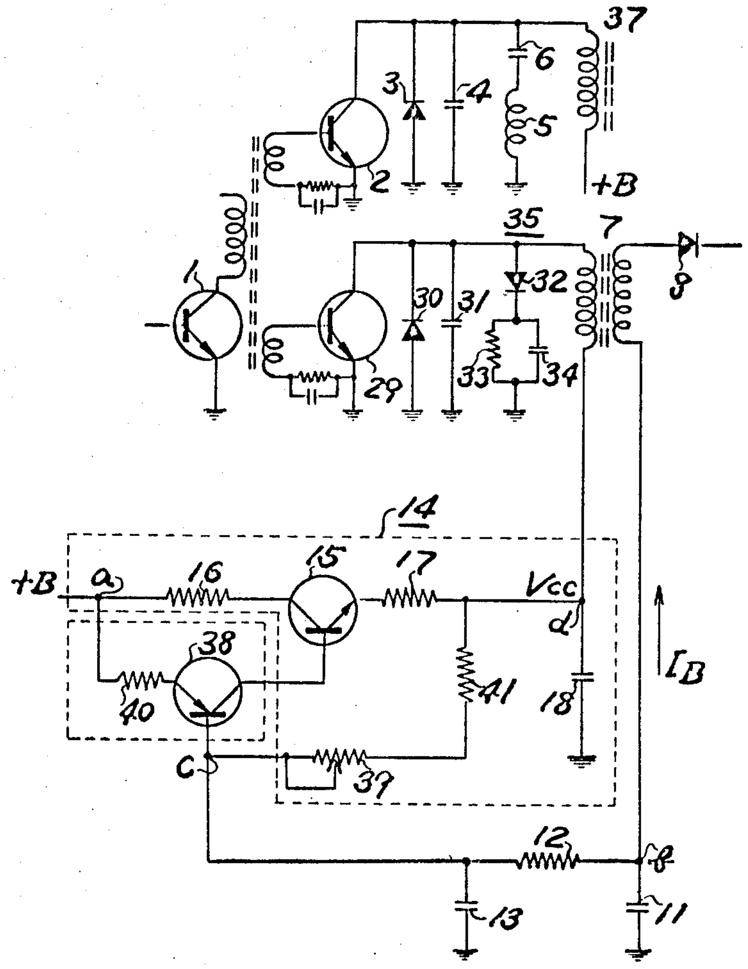
FIG. 6 is a schematic similar to that of FIG. 4, but wherein a portion of said high voltage output circuit is further modified.

In FIG. 6 is shown the sixth embodiment of the present invention wherein the detector means comprises a p-n-p type transistor 38, as a substitute for the detector means generally composed of the variable resistor 9 and the resistor 10 in accordance with the embodiments heretofore described.

Although the details of the function of the circuit shown in FIG. 6 has been omitted, it will be apparent to those skilled in that art that the provision of the detection transistor 38 results in the improvement of the detection sensibility as well as the control sensibility.

It is noted that reference numerals 39, 40, and 41 represent a variable resistor and fixed resistors, respectively.

Although the present invention has been fully disclosed in connection with the preferred embodiments with reference to the attached drawings, it should be noted that various modifications other than herein disclosed will be apparent to those skilled in the art without departing the true spirit and scope of the invention. For example, a lower portion of the circuit schematic of FIG. 2, in which the detector means a control circuit are included, can be connected with the upper portion of FIG. 5 to give a high voltage stabilizing circuit. In addition thereto, the lower portion of FIG. 3 in which the detector means and control circuit are included can be connected with an upper portion of FIG. 5 for the same purpose.

What is claimed is:

1. A stabilizing circuit for use in a television receiver having a cathode ray tube and a flyback transformer including primary and secondary windings, comprising:
   - detector means series connected between a power source and the low voltage terminal of the secondary winding of the flyback transformer, said detector means detecting a beam current supplied from the power source to said cathode ray tube,
   - means for connecting the high voltage terminal of said secondary winding of the flyback transformer to the anode electrode of said cathode ray tube of said receiver,
   - a power output transistor, and
   - a control circuit including a control transistor connected in series in the energizing circuit from said power source to said output transistor, for controlling power supplied from the power source to said power output transistor, said control transistor being controlled by the output of said detector means to adjust the power supplied to said power output transistor from said power source as a function of the output of said detector means in response to detected variations in the level of beam current supplied from the power source to said cathode ray tube.

2. A stabilizing circuit as recited in claim 1 wherein said cathode ray tube includes a horizontal deflection winding and wherein said power output transistor provides a deflection voltage to said horizontal deflection winding for controlling the deflection of the scanning beam of the cathode ray tube.

3. A stabilizing circuit as recited in claim 2 wherein said deflection output transistor is connected in series with the primary winding of said flyback transformer and said control transistor to said power source.

4. A stabilizing circuit as recited in claim 2 wherein there is further provided:
   - a drive transistor, and
   - a high voltage output transistor connected between ground potential and through the primary winding of said flyback transformer to a power source,
   - said high voltage and said deflection output transistors being coupled to said drive transistor to be driven in conduction in common by the output of said drive transistor.

5. A stabilizing circuit as recited in claim 1 wherein said power output transistor provides an output to the primary winding of said transformer, the secondary winding thereof providing the high voltage output for supply to the anode of the cathode ray tube.

6. A stabilizing circuit as recited in claim 5 wherein said power output transistor is connected in series with the primary winding of said flyback transformer and said control circuit to said power source.

7. A stabilizing circuit as recited in claim 6 wherein there is further provided:
   - a deflection output transistor connected between ground potential and said power source for energizing a deflection coil of said cathode ray tube, and
   - said high voltage and said deflection output transistors are coupled to a drive transistor to be driven in conduction in common by the output of said drive transistor.

8. A stabilizing circuit as recited in claim 1 wherein there is further provided a filter connected between said detector and said low voltage terminal of said secondary winding of said flyback transformer.

9. A stabilizing circuit as recited in claim 8 wherein:
   - said filter comprises a resistor connected in series with said detector and said low voltage terminal of said secondary winding, and
   - a capacitor connected between the junction of said resistor and said secondary winding and ground.

10. A stabilizing circuit as recited in claim 1 wherein:
   - said control transistor of said control circuit is connected in its collector-emitter conducting path in series from said power source and through said primary winding of said flyback transformer to the collector-emitter conducting path of said output transistor, and said detector is connected between said power source and the base terminal of said transistor of said control circuit.

11. A stabilizing circuit as recited in claim 10 wherein there is further provided a filter circuit connected between the junction of said detector circuit and said transistor of said control circuit and the low voltage terminal of said secondary winding of said flyback transformer.

12. A stabilizing circuit as recited in claim 10 wherein said detector comprises resistive means.

13. A stabilizing circuit as recited in claim 10 wherein said detector comprises a further transistor with its collector-emitter conducting path connected between the base of the transistor of said control circuit and said power source and with its base electrode connected to said filter circuit and through further resistive means to the terminal of said control circuit connected in circuit with said output power transistor.

14. A stabilizing circuit as recited in claim 1 wherein said control circuit includes high gain amplification means responsive to the output of said detector means for generating an amplified response between the input and output terminals of said control circuit in response to variations of the beam current detected by said detector means, and there is further provided:

a shunt path connected between said power source and said low voltage terminal of said secondary winding of said flyback transformer, said shunt means conducting a portion of the beam current to reduce the effective response of said detector means and prevent overcompensation by said control circuit.

15. A stabilizing circuit for use in a color television receiver comprising:

a detector means for detecting a beam current supplied from a power source, one terminal of said detector means being connected to said power source, a flyback transformer including a secondary winding having hot and cold terminals, the hot terminal thereof being connected to the anode of a cathode ray tube of said receiver and the cold terminal thereof being connected to the other terminal of said detector means, a deflection output transistor, and a control circuit including a control transistor connected in series in the energizing circuit from said power source to said output transistor, for controlling voltage to be applied to said deflection output transistor, said control circuit being controlled by the output of said detector means.

16. A stabilizing circuit as recited in claim 15 wherein there is further provided:

a filter connected between said other terminal of said detector means and said cold terminal of said secondary winding of said flyback transformer, said filter including a resistor for effecting said connection therebetween and a capacitor connected between the junction of said resistor and said cold terminal and ground.

17. A stabilizing circuit as recited in claim 16 wherein there is further provided shunt means connected between the power source and the cold terminal of said secondary winding in parallel with said detector means for shunting a portion of the beam current supplied by said power source from said detector means.

18. A stabilizing circuit as recited in claim 17 wherein there is further provided a unidirectionally conductive element connected in series between the other terminal of said detector means and said resistor of said filter.

19. A stabilizing circuit for use in a color television receiver comprising:

a detector means for detecting a beam current supplied from a power source, one terminal of said detector means being connected to said power source, a flyback transformer including a secondary winding having hot and cold terminals, the hot terminal thereof being connected to the anode of a cathode ray tube of said receiver and the cold terminal thereof being connected to the other terminal of said detector means, a high voltage output transistor, and a control circuit including a control transistor connected in series in the energizing circuit from said power source to said output transistor, for controlling voltage to be applied to said high voltage output transistor, said control circuit being controlled by the output of said detector means.

20. A stabilizing circuit as recited in claim 19 wherein there is further provided:

a filter connected between said other terminal of said detector means and said cold terminal of said secondary winding of said flyback transformer, said filter including a resistor for effecting said connection therebetween and a capacitor connected between the junction of said resistor and said cold terminal and ground.

21. A stabilizing circuit as recited in claim 20 wherein there is further provided shunt means connected between the power source and the cold terminal of said secondary winding in parallel with said detector means for shunting a portion of the beam current supplied by said power source from said detector means.

22. A stabilizing circuit as recited in claim 21 wherein there is further provided a unidirectionally conductive element connected in series between the other terminal of said detector means and said resistor of said filter.

* * * * *

Disclaimer 3,721,858.—*Kunio Shimizu*, Osaka, Japan. SIZE AND HIGH VOLTAGE STABILIZING CIRCUIT. Patent dated Mar. 20, 1973. Disclaimer filed April 25, 1975, by the assignee, *Sanyo Electric Company, Limited*.

Hereby enters this disclaimer to claims 1 through 14, inclusive and 19 through 22, inclusive, of said patent.

[*Official Gazette May 13, 1975.*]